(12) United States Patent
Tasher et al.

(10) Patent No.: US 8,886,955 B2
(45) Date of Patent: Nov. 11, 2014

(54) SYSTEMS AND METHODS FOR BIOS PROCESSING

(75) Inventors: Nir Tasher, Tel Mond (IL); Dan Morav, Herzliya (IL)

(73) Assignee: Nuvoton Technology Corporation, Hsinchu (TW)

( * ) Notice: Subject to any disclaimer, the term of this patent is extended or adjusted under 35 U.S.C. 154(b) by 1818 days.

(21) Appl. No.: 11/727,861

(22) Filed: Mar. 28, 2007

(65) Prior Publication Data

US 2008/0250252 A1    Oct. 9, 2008

(51) Int. Cl.
*G06F 12/14*    (2006.01)

(52) U.S. Cl.
CPC .... *G06F 12/1416* (2013.01); *G06F 2212/2022* (2013.01)
USPC .......................................... 713/189; 713/182

(58) Field of Classification Search
CPC . G06F 12/00; G06F 2212/00; G06F 12/1416; G06F 2212/2022
USPC .......... 380/270, 255, 247; 713/150, 100, 182, 713/188, 189; 726/26, 27, 28, 29, 30; 709/201, 212, 213, 220, 223, 200
See application file for complete search history.

(56) References Cited

U.S. PATENT DOCUMENTS

| | | | |
|---|---|---|---|
| 6,993,648 | B2 | 1/2006 | Goodman et al. |
| 7,200,758 | B2 | 4/2007 | Zimmer |
| 7,711,942 | B2 | 5/2010 | Wang et al. |
| 2005/0132177 | A1* | 6/2005 | Challener et al. ................. 713/1 |
| 2005/0163317 | A1* | 7/2005 | Angelo et al. ................ 380/259 |

FOREIGN PATENT DOCUMENTS

| | | |
|---|---|---|
| CN | 92127980 | 10/1992 |
| CN | 1752887 A | 3/2006 |

OTHER PUBLICATIONS

Trusted Computing Group, "TPM Main Part I Design Principles," http://www.trustedcomputinggroup.org/specs/TPM/Main_Part1_Rev94.zip, (Mar. 2006).
Trusted Computing Group, TPM Main Part 2 Structures, http://www.trustedcomputinggroup.org/specs/TPM/Main_Part2_Rev94.zip, (Mar. 2006).
Trusted Computing Group, "TPM Main Part 3 Commands," http://www.trustedcomputinggroup.org/specs/TPM/Main_Part3_Rev94.zip, (Mar. 2006).
Trusted Computing Group, "TCG PC Client Specific TPM Interface Specification (TIS)," http://www.trustedcomputinggroup.org/groups/pc_client/TCG_PCClientTPMSpecification_1-20_1-00_FINAL.pdf, (2005).
Trusted Computing Group, "TCG Specification Architecture Overview," http://www.trustedcomputinggroup.org/groups/TCG_1_0_Architecture_Overview.pdf, (Apr. 28, 2004).

(Continued)

*Primary Examiner* — Jeffrey Pwu
*Assistant Examiner* — Nega Woldemariam
(74) *Attorney, Agent, or Firm* — Oliff PLC

(57) ABSTRACT

Methods and systems for Basic Input/Output System BIOS processing such as hashing are disclosed. In one embodiment, there is a direct interface between a security module and a non-volatile memory storing the BIOS in a computing system so that the security module may directly access the BIOS without using the central processing unit CPU as an intermediary. In one embodiment, the security module is powered by standby power and therefore can begin BIOS processing even if the computing system has not yet been turned on.

16 Claims, 3 Drawing Sheets

(56) References Cited

OTHER PUBLICATIONS

Trusted Computing Group, "TCG PC Client Specific Implementation Specification for Conventional BIOS," http://www.trustedcomputinggroup.org/specs/PCClient/TCG_PC-ClientImplementationforBIOS_1-20_1-00.pdf. (2005).

Microsoft, "BitLocker Drive Encryption: Technical Overview," http://technet.microsoft.com./en-us/windowsvista/aa906017.aspx, (Apr. 2006).

Wikipedia, "Windows Vista," http://en.wikipedia.org/wiki/windows_vista, (Mar. 2007).

Trusted Computing Group, http://trustedcomputinggroup.org/faq/TPMFAQ, (2007).

Wikipedia, "BIOS," http://en.wikipedia.org/wiki/BIOS, (Nov. 2006).

Marchesini, John et al., "Open-Source Applications of TCPA Hardware," Department of Computer Science, Dartmouth College, (Dec. 2004).

Tech Target, "BIOS," http://whatis.techtarget.com/definition/0,289893,sid9_gci213814,00.html, (Oct. 2006).

Microsoft, "Identity and Access Control," http://technet2.microsoft.com/WindowsVista/en/library/bala3800-ce29-4f09-89ef-65bce923edb51033.mspx, (2007).

Trusted Computing Group, "A Summary of Changes with Respect to the v1.1b TPM Specification," TPM v1.2 Specification Changes (Oct. 2003).

Wikipedia, "Trusted Platform Module," http://en.wikipedia.org/wiki/Trusted_Platform_Module, (Oct. 2006).

* cited by examiner

SYSTEMS AND METHODS FOR BIOS PROCESSING

FIELD OF THE INVENTION

This invention relates to computing system security.

BACKGROUND OF THE INVENTION

Typically, there are three possible power states for a computing system. The first power state is the unpowered state, when the computing system is not connected to any power supply (for example not connected to an electric outlet or to a main battery). The second power state is the standby power state, also known as Soft Off (G2/S5) or hibernation (S4 Non-Volatile Sleep) mode, when the computing system is connected to a power supply (for example plugged into an electric outlet or the main battery is in the battery bay) but the computing system has not been turned on (i.e. not been powered up). The third power state is the power on state, when the computing system is powered up (i.e. turned on).

A computing system may be reset for example with a cold boot host platform reset (which includes a power on self test for example after turning on the computing system), a hardware host platform reset (i.e. a reset of computing system components), or a warm (also known as soft) boot host platform reset (i.e. a software caused reset). After the computing system has been reset, there follows a typically although not necessarily short reset period. During the reset period, a host central processing unit CPU in the computing system is not active. The Basic Input/Output System (BIOS) is the software code and/or data that the host CPU in the computing system uses to get the computing system started (i.e. to boot up the computing system) after the reset period has ended. The BIOS may for example manage data flow between the operating system of the computing system and attached devices such as the hard disk, video adapter, keyboard, mouse, printer, etc. The BIOS may also for example prepare the computing system so that other software programs stored on various media (such as hard drives, floppies, and CDs) can load, execute, and assume control of the computing system.

In order to perform an integrity check of the system, after the reset period has ended, part or all of the BIOS may be measured (for example hashed). Performing the BIOS measurement defers the running of the BIOS and the subsequent loading of the operating system.

The host CPU may hash part or all of the BIOS, after the reset period has finished. Alternatively, after the reset period has ended the host CPU may use another module which preferably can perform the hashing of the BIOS more quickly than the CPU at that point in time.

One type of security module which may be used to check the integrity of the BIOS is a Trusted Platform Module (TPM) which conforms with one or more Trusted Computing Group (TCG) specifications.

In the TCG specifications, the static core root of trust for measurement CRTM is the immutable part of the computing device initialization code which executes after the computing system has been reset. The trust in the host platform (the host platform including the motherboard, host CPU, host root of trust measurement RTM, TPM, and all host peripherals that are attached to the motherboard) is based on the static CRTM. In one implementation, the BIOS boot block is termed the static CRTM. After the reset period has ended, the static CRTM executed by the CPU initializes a TPM driver which is used by the host CPU to read, write and control the TPM. The CPU reads a section of the BIOS (other than the static CRTM) and feeds the section of the BIOS to the TPM for hashing. The TPM hashes the section of the BIOS. The CPU reads the hashed BIOS section and the hashed BIOS section or a function thereof is stored in one or more platform configuration register PCR in the TPM. Alternatively, the TPM stores the hashed BIOS section or a function thereof in one or more PCR.

SUMMARY OF THE INVENTION

According to the present invention, there is provided a method of Basic Input/Output System BIOS processing in a computing system, comprising: a security module in the computing system reading at least part of a BIOS stored in a non-volatile memory in the computing system via an interface which directly connects the security module with the non-volatile memory; and the security module processing the at least part of the BIOS.

According to the present invention, there is also provided a method of Basic Input/Output System BIOS processing in a computing system, comprising: a security module in the computing system sensing that standby power has become available after having not been available; the security module then reading at least part of the BIOS stored in a non-volatile memory in the computing system via an interface which directly connects the security module with the non-volatile memory; and the security module processing the at least part of the BIOS.

According to the present invention, there is further provided a system for Basic Input/Output System BIOS processing, comprising: a non-volatile memory configured to store the BIOS; a security module configured to read at least part of the BIOS and configured to process the at least part of the BIOS; and an interface directly connecting between the security module and the non-volatile memory.

According to the present invention, there is still further provided a security module for Basic Input/Output System BIOS processing, comprising: a sensor configured to sense a trigger for reading at least part of the BIOS; a fetching module configured to read the at least part of the BIOS from a non-volatile memory storing the BIOS via an interface directly connecting between the non volatile memory and the security module after the sensor has sensed the trigger; and a processing module configured to process the read at least part of the BIOS.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF EXEMPLARY EMBODIMENTS

Figure 1:
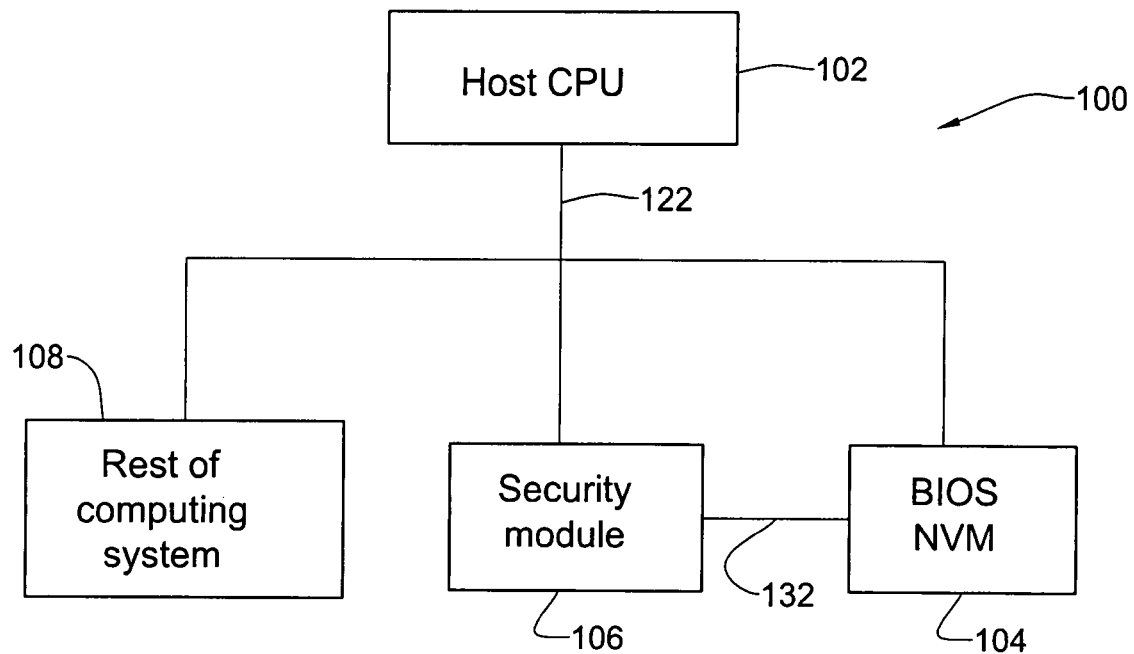
FIG. 1 is a block diagram of a computing system with BIOS processing, according to an embodiment of the present invention.

Described herein are embodiments of the current invention for BIOS processing.

The term "computing system" as used herein includes any system which includes a Basic Input/Output System (BIOS).

As used herein, the phrase "for example," "such as" and variants thereof describing exemplary implementations of the present invention are exemplary in nature and not limiting.

Reference in the specification to "one embodiment", "an embodiment", "some embodiments", "another embodiment", "other embodiments" or variations thereof means that a particular feature, structure or characteristic described in connection with the embodiment(s) is included in at least one embodiment of the invention. Thus the appearance of the phrase "one embodiment", "an embodiment", "some embodiments", "another embodiment", "other embodiments" or variations thereof are not necessarily referring to the same embodiment(s).

Some embodiments of the present invention are disclosed primarily as a method and it will be understood by a person of ordinary skill in the art that an apparatus such as a conventional data processor incorporated with a database, software and other appropriate components could be programmed or otherwise designed to facilitate the practice of some method embodiments of the present invention.

Unless specifically stated otherwise, as apparent from the following discussions, it is appreciated that throughout the specification discussions, utilizing terms such as, "processing", "reading", "computing", "beginning", "calculating", "sensing", "determining", "storing", "running", "applying", "measuring", "associating", "hashing", "providing" or the like, refer to the action and/or processes of any combination of software, hardware and/or firmware. For example, in one embodiment a computer, processor or similar electronic computing system may manipulate and/or transform data represented as physical, such as electronic, quantities within the computing system's registers and/or memories into other data, similarly represented as physical quantities within the computing system's memories, registers or other such information storage, transmission or display devices.

Some embodiments of the present invention may use terms such as, processor, device, computing system, computer, apparatus, system, sub-system, module, unit, engine, etc, (in single or plural form) for performing the operations herein. These terms, as appropriate, refer to any combination of software, hardware and/or firmware configured to perform the operations as defined and explained herein. The module(s) (or counterpart terms specified above) may be specially constructed for the desired purposes, or it may comprise a general purpose computing system selectively activated or reconfigured by a computer program stored in the computing system. Such a computer program may be stored in a computer readable storage medium, such as, but not limited to, any type of disk including optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, any other type of media suitable for storing electronic instructions that are capable of being conveyed via a computing system bus.

The method(s)/processe(s)/module(s) (or counterpart terms specified above) and display(s) presented in some embodiments herein are not inherently related to any particular computing system or other apparatus, unless specifically stated otherwise. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

FIG. 1 illustrates a computing system architecture 100 in accordance with an embodiment of the invention. Computing system 100 includes a host central processing unit CPU (also known as a processor or microprocessor) 102, a non-volatile memory 104 in which at least the BIOS is stored, a security module 106, and the remainder of the computing system 108. Each of modules 102, 104, 106, and 108 may be made up of any combination of software, hardware and/or firmware capable of performing the functions as defined and explained herein.

In one embodiment nonvolatile memory NVM 104 is any suitable memory with write ability which retains the contents within when power is turned off. Examples include inter-alia: electrically erasable programmable read only memory EEPROM, random access memory RAM powered by a battery, flash memory, semiconductor memory, magnetic memory, optical memory, any combination of the above, etc.

NVM 104 includes the BIOS used by the host CPU to boot up computing system 100. Depending on the embodiment, NVM 104 may store BIOS code and/or data. It should be noted that he term 'BIOS' is used herein to refer to BIOS code and/or data, as appropriate. NVM 104 may optionally also store other items. For example in one embodiment NVM104 also stores code and/or data used by security module 106.

In one embodiment, security module 106 is configured to process some or all of the BIOS as will be described in more detail below. The type of processing is not limited by the invention. Depending on the embodiment, the result(s) of the BIOS processing may be used for any purpose or for no purpose whatsoever. The invention places no limitation on any effect the BIOS processing may have on subsequent operation of the computing system.

Depending on the embodiment, security module 106 may or may not have additional functionality unrelated to BIOS processing.

In some embodiments, security module 106 may be considered to be a Trusted Platform Module (TPM) because of compliance with one or more Trusted Computing Group (TCG) specifications, as amended from time to time, except for sections, if any, which conflict with the description herein. For example, in one of these embodiments, security module 106 may be considered to be a TPM because of compliance with any of the following specifications, earlier version(s) thereof, or future revision(s) thereof, except for sections, if any, which conflict with the description herein: www.trustedcomputinggroup.org/specs/TpM/Main_Part1_Rev94.zip, www.trustedcomputinggroup.org/specs/TPM/Main_Part2_Rev94.zip, www.trustedcomputinggroup.org/specs/TPM/Main_Part3_Rev94.zip, www.trustedcomputinggroup.org/groups/pc_client/TCG_PCClientTPMSpecification__1-20__1-00_FINAL.pdf, www.trustedcomputinggroup.org/groups/TCG__1__0_Architecture_Overview.pdf, and www.trustedcomputinggroup.org/specs/PCClient/TCG_PCClientImplementationforBIO S__1-20__1-00.pdf. These specifications are hereby incorporated by reference. In one of these embodiments, the BIOS is a TCG compliant BIOS.

Block 108 includes all other modules comprising the physical platform of computing system 100 for any particular embodiment, as known in the art.

As illustrated in FIG. 1, host CPU 102 communicates with NVM 104, security module 106, and block 108 via one or more interface(s) 122. In some embodiments, interface(s) 122 includes one or more computer bus(es). Depending on the embodiment, interface(s) 122 may include for example an LPC bus, an ISA bus, a PCI bus, any combination of the above, and/or any other suitable bus(es). For simplicity of description, interface(s) 122 is referred to herein below as bus 122 in the single form, and should be understood to include embodiments where there is a plurality of buses 122 and/or where interface(s) 122 do not include a bus as well as an embodiment where there is a single bus 122.

In computing system 100, security module 106 has autonomous access to NVM 104 without relying on CPU 102 because security module 106 interfaces directly to NVM 104 via interface(s) 132.

In some embodiments interface(s) 132 includes one or more sideband(s), where a sideband refers to an interface which does not use main computing system resources. For example interface(s) 132 may include one or more separate connection(s) or may use one or more special protocol(s) on existing connection(s). In one of these embodiments, interface(s) 132 includes one or more computer bus(es) separate from bus 122. In one of these embodiments interface(s) 132 include a bus which is faster than bus 122. For example in one of these embodiments bus 122 may include a Low Pin Count LPC bus and interface(s) 132 may include a Serial Peripheral Interface SPI.

In another embodiment, interface(s) 132 includes one or more direct connection(s) via bus 122 (i.e. bus 122 is adapted to include direct connection(s) 132 between NVM 104 and security module 106).

For simplicity of description, interface(s) 132 is referred to herein below as interface 132 in the single form and should be understood to include both embodiments where there is a single interface 132 and a plurality of interfaces 132.

In one embodiment, security module 106 is in the same physical package as NVM 104. The integration of security module 106 and NVM 104 in this embodiment provides additional protection against tampering because an attacker cannot replace the BIOS in NVM 104 with a version of the BIOS which is hacked, unauthorized and/or unapproved by platform manufacturer and/or owner for use, without alerting security module 106. Therefore the integration provides protection for example against a replay attack (i.e. attempting to replay an older version of the BIOS). Optionally, assuming that other items are also stored in NVM 104, the usage of the same physical package for security module 106 and NVM 104 may also better protect at least some of these other items against tampering.

Figure 2:
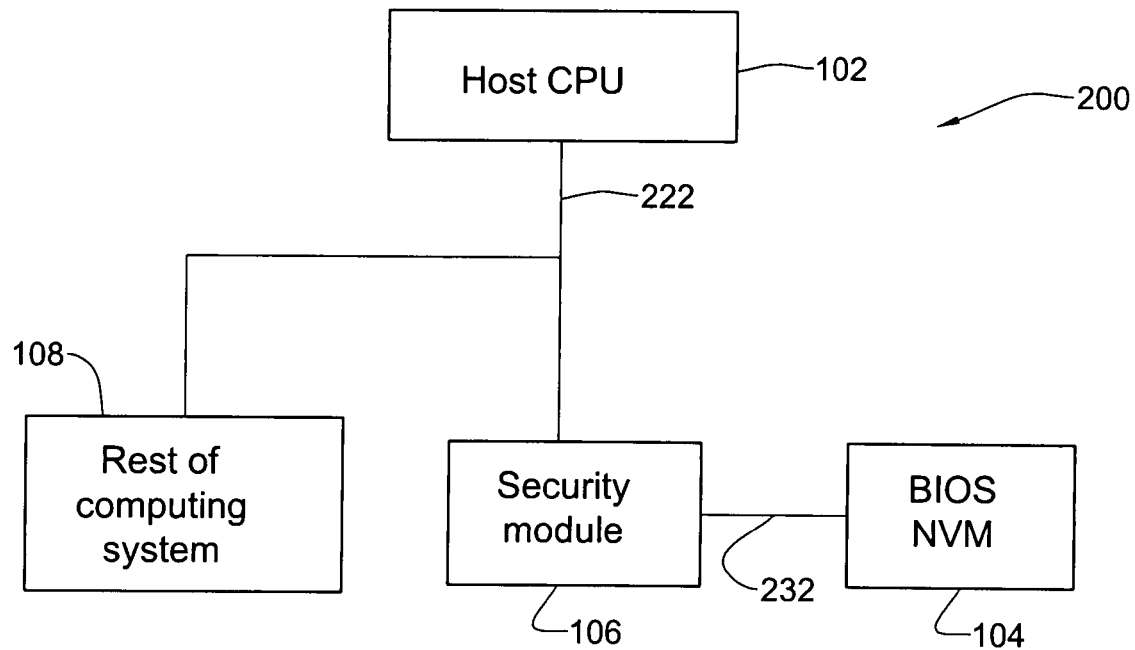
FIG. 2 is a block diagram of another computing system with BIOS processing, according to an embodiment of the present invention.

FIG. 2 shows another computing system architecture 200 in accordance with an embodiment of the invention. Similarly to computing system 100, computing system 200 includes host CPU 102, BIOS NVM 104, security module 106 and rest of computing system 108 as described above, and each of modules 102, 104, 106, and 108 may be made up of any combination of software, hardware and/or firmware capable of performing the functions as defined and explained herein. However in computing system 200, CPU 102 is connected to security module 106 and block 108 via one or more interface(s) 222. In computing system 200, CPU 102 is not connected via interface(s) 222 to NVM 104 but instead CPU 102 is indirectly connected to NVM 104 via security module 106.

In some embodiments, interface(s) 222 includes one or more computer buses. Depending on the embodiment, interface(s) 222 may include for example an LPC bus, an ISA bus, a PCI bus, any combination of the above, and/or any other suitable bus(es). For simplicity of description, interface(s) 222 is referred to herein below as bus 222 in the single form, and should be understood to include embodiments where there is a plurality of buses 222 and/or where interface(s) 222 do not include a bus as well as an embodiment where there is a single bus 222.

In computing system 200, security module 106 has autonomous access to NVM 104 without relying on CPU 102 because security module 106 interfaces directly to NVM 104 via interface(s) 232.

In some embodiments interface(s) 232 includes one or more sideband(s), where a sideband refers to an interface which does not use main computing system resources. For example interface(s) 232 may include one or more separate connection(s) or may use one or more special protocol(s) on existing connection(s). In one of these embodiments, interface(s) 232 includes one or more computer bus(es) separate from bus 222. In one of these embodiments interface(s) 232 include a bus which is faster than bus 222. For example in one of these embodiments bus 222 may include a Low Pin Count LPC bus and interface(s) 232 may include a Serial Peripheral Interface SPI.

In another embodiment, interface(s) 232 includes one or more direct connection(s) via bus 222 (i.e. bus 222 is adapted to include direct connection(s) 232 between NVM 104 and security module 106).

For simplicity of description, interface(s) 232 is referred to herein below as interface 232 in the single form and should be understood to include both embodiments where there is a single interface 232 and a plurality of interfaces 232.

In one embodiment, security module 106 is in the same physical package as NVM 104. The integration of security module 106 and NVM 104 in this embodiment provides additional protection against tampering because an attacker cannot replace the BIOS in NVM 104 with a version of the BIOS which is hacked, unauthorized and/or unapproved by platform manufacturer and/or owner for use, without alerting security module 106. Therefore the integration provides protection for example against a replay attack (i.e. attempting to replay an older version of the BIOS). Optionally, assuming that other items are also stored in NVM 104, the usage of the same physical package for security module 106 and NVM 104 may also better protect at least some of these other items against tampering.

Now will be presented method embodiments which may be executed inter-alia by computing system 100 and/or computing system 200.

Figure 3:
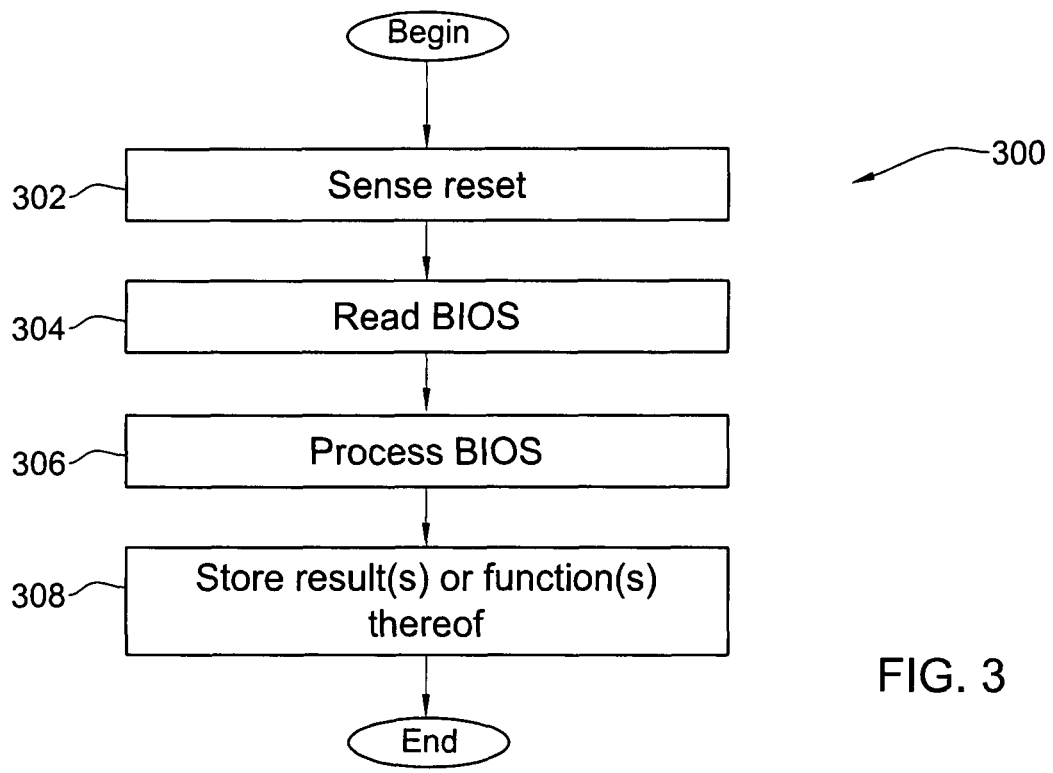
FIG. 3 is flowchart of a method for BIOS processing, according to an embodiment of the present invention.

FIG. 3 illustrates a flowchart of a method 300 for BIOS processing according to an embodiment of the present invention. In one embodiment, method 300 is executed by security module 106. Depending on the embodiment, security module 106 which executes method 300 may be provided with power only after computing system 100 or 200 has been turned on or may be provided with standby power (meaning that security module 106 is provided with power as long as computing system 100 or 200 is connected to a power supply, for example plugged into an electric outlet or having the main battery in the battery bay, regardless of whether or not computing system 100 or 200 has been turned on).

In stage 302, the security module 106 senses that computing system 100 or 200 has been reset (i.e. there has been a host reset). For example in one embodiment, security module 106 receives an LRESET input signal when computing system 100 or 200 is reset. For example, in one embodiment security module 106 proceeds to stage 304 immediately after sensing that the computing system has been reset (i.e. may proceed even during the reset period), however in another embodiment there may be a time lag between stage 302 and stage 304. In stage 304, security module 106 reads a BIOS section from NVM 104 via interface 132 or 232 and processes the read BIOS section in stage 306.

In some embodiments, the BIOS processing in stage 306 includes measuring the read BIOS section. In some of these embodiments, the BIOS measuring includes hashing the read BIOS section. Typically hashing includes applying a unidirectional function so that it is computationally infeasible for an attacker to determine the specific input message for the hash result and thereby have the ability to substitute a different input message which will produce the same measurement. For example, in some embodiments where there is hashing, the hash function used for hashing the read BIOS section is in accordance with an SHA standard as published by the US government standards agency National Institute of Standards and Technology NIST. Continuing with the example in one of these embodiments the SHA-1 cryptographic hash is specifically used. In other embodiments security module 106 may perform additionally or alternatively other processing on part or all of the BIOS.

In optional stage 308, the result(s) of the BIOS processing, for example the BIOS hash(es), or function(s) thereof is stored in memory, for example in security module 106. The storing of the processing result(s) or function(s) thereof to memory may be performed for example by security module 106.

In one embodiment where security module 106 is a TPM, the TPM stores BIOS hash result(s) to one or more platform configuration register PCR within the TPM in stage 308, for example PCR(0) and/or PCR(1).

In one embodiment, security module 106 reads a section of the BIOS from NVM 104 via interface 132 or 232 in stage 304, processes the read section in stage 306, and optionally the interim processing result or a function thereof is stored in memory in stage 308 prior to security module 106 reading another section of BIOS (i.e. prior to repeating stages 304, 306 and optionally 308 for another section). In another embodiment, stage 304 is executed only once with security module 106 reading all BIOS section(s) designated for processing from NVM 104 via interface 132 or 232, prior to processing any of the sections. In another embodiment, all BIOS section(s) designated for processing by security module 106 may be read and processed together in a single execution of stages 304 and 306. In one embodiment, interim processing result(s) or function(s) thereof from various BIOS sections may be stored in memory in stage 308 as well as the final processing result(s) or function(s) thereof (resulting from the processing of all section(s) contributing to the final result(s)), whereas in another embodiment only final processing result(s) or function(s) thereof may be stored in memory in stage 308. In another embodiment, stage 308 may be omitted and processing result(s) or function(s) thereof are not necessarily stored.

In one embodiment, only section(s) of BIOS code are read and processed. In another embodiment, only section(s) of BIOS data are processed. In another embodiment, BIOS code section(s) are read and processed separately from BIOS data section(s), and therefore separate final processing results are yielded. In another embodiment, a final processing result may represent processed section(s) from both the BIOS code and data. In another embodiment, there may be any number of final processing result(s), each representing the processing of section(s) of BIOS code and/or data.

In some embodiments where security module 106 is a TPM, a section of the BIOS is hashed into a result and the result is stored in a PCR (or another memory location). In one of these embodiments, the hashing is repeated for each BIOS section designated for processing, with the result previously stored to a PCR/another memory location (in the last iteration) concatenated with an additional section of BIOS hash result and hashed into an (updated) result. The hashing and storing is repeated until all of the BIOS designated for processing by the TPM have been hashed into a final result and stored in a PCR (or another memory location). In one of these embodiments, all of the BIOS is hashed into the final result (i.e. all of the BIOS is designated for processing by the TPM).

In one embodiment, any stored processing result(s) or function(s) thereof are secure. For example, the security may arise from the nature of the memory location used for storage in stage 308, i.e. because the memory is protected. As another example, the security may arise additionally or alternatively from the nature of the operation used. Continuing with the example, the extension of results described above may in some cases contribute to the security of the stored processing result(s) or function(s) thereof.

In some embodiments after computing system 100 has been reset and the reset period has passed, CPU 102 may check whether security module 106 has begun or is beginning process 300, and if not CPU 102 may execute the static CRTM, initializing a driver which in these embodiments is used by the host CPU to read, write and control security module 106. The CPU may read at least part of the BIOS designated for processing via bus 122 and provide the read BIOS to security module 106 for processing in stage 306. In one of these embodiments, security module 106 may subsequently read any unread BIOS designated for processing via interface 132. In another of these embodiments, once CPU 102 has read at least part of the BIOS designated for processing, CPU 102 continues to read any unread BIOS designated for processing.

In another embodiment after computing system 100 or 200 has been reset and the reset period has passed, CPU 102 may check whether security module 106 has begun or is beginning process 300, and if not CPU 102 may instruct security module 106 to begin process 300 (for example starting with stage 304).

In one embodiment, CPU 102 may use a predefined command or signal (which may in some cases be vendor specific) to check whether security module 106 has begun or is beginning process 300.

In another embodiment CPU 102 does not check whether security module 106 has begun or is beginning process 300 and assumes that security module 106 has or will execute method 300.

In one embodiment prior to CPU 102 running any BIOS section designated for processing by security module 106, the section is handled as in any of stages 304,306 and/or 308 of method 300 described above. In another embodiment, prior to CPU 102 running any BIOS section designated for processing by security module 106, all of the BIOS section(s) designated for processing are handled as in any of stages 304,306 and/or 308 of method 300 described above. In one embodiment, only if the processing result of a BIOS section conforms to a predetermined criterion, will CPU 102 run the BIOS section or only if the processing result(s) of all of the BIOS section(s) designated for processing conforms to a predetermined criterion, will CPU 102 run the BIOS section(s). In another embodiment, there is no predetermined criterion and/or there is no evaluation whether the processing result(s) of BIOS section(s) conform to a predetermined criterion and CPU 102 can therefore run the handled BIOS section(s) regardless of the processing result(s).

In some embodiments of the invention, fewer, more, or different stages than those shown in FIG. 3 may be executed. In some embodiments of the invention the stages illustrated in FIG. 3 may be executed in a different order than shown in FIG. 3 and/or in some embodiments one or more stages may be executed simultaneously.

From the description of various embodiments of method 300, it should be evident to the reader that the presence of interface 132 or 232 enables security module 106 in some embodiments to control the BIOS reading in stage 304 and/or to control subsequent stages of method 300. In these embodiments, security module 106 may directly access NVM 104 without requiring CPU 102 to function as an intermediary between security module 106 and NVM 104 (i.e. CPU 102 would necessarily be an intermediary if communication between security module 106 and NVM 104 was instead only via a bus connecting CPU 102 to each of security module 106 and NVM 104). Therefore in these embodiments with direct access by security module 106 to NVM 104, the BIOS reading is typically although not necessarily faster than when CPU 102 functions as the intermediary. In one of these embodiments where the interface which is used for interface 132 or interface 232 allows faster communication than a bus which would have connected or does connect intermediary CPU 102 to each of security module 106 and NVM 104, the BIOS reading may typically although not necessarily be accelerated even more in comparison. In one embodiment where security module 106 begins stage 304 during the reset period, the BIOS handling of method 300 may in some cases be quicker compared an implementation which necessarily waits until the reset period has ended for CPU 102 to begin BIOS reading.

In some embodiments of method 300, method 300 is executed after any type of computing system reset, for example a cold boot host platform reset (which includes a power on self test for example after turning on the computing system), a hardware host platform reset (i.e. a reset of computing system components), or a warm (also known as soft) boot host platform reset (i.e. a software caused reset). In other embodiments of method 300, method 300 is executed only after certain type(s) of computing system resets. In these other embodiments, in stage 302 security module 302 is configured to sense certain type(s) of resets and only after sensing a reset of a predetermined type(s) will the remainder of method 300 be executed. For example in some of these other embodiments, security module 106 is configured to sense a cold boot host reset, and only if a cold boot host reset is sensed in stage 302 will the remainder of method 300 be executed. Continuing with the example, in one of these other embodiments, security module 106 monitors both the power signal (VDD) and the LRESET signal and if both are asserted security module knows that a cold boot host reset has occurred. In some of these other embodiments where method 300 is executed only after certain type(s) of computing system resets, method 300 may be executed less often than if the trigger for method 300 is a reset of any type.

Figure 4:
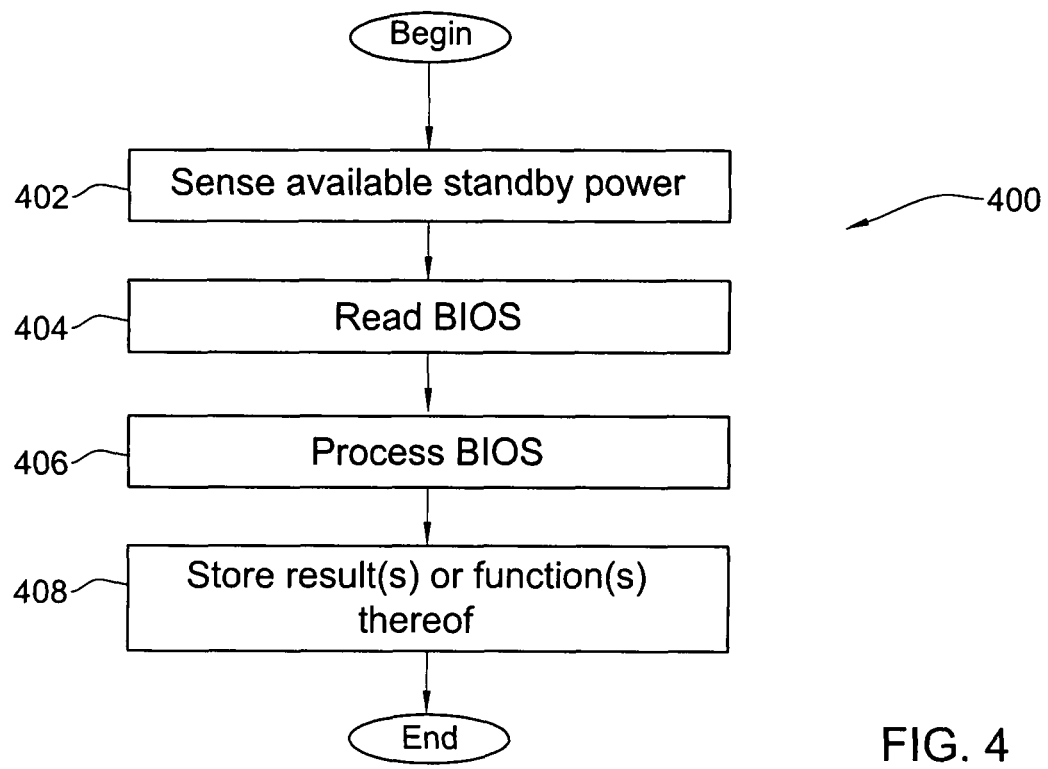
FIG. 4 is a flowchart of a method for BIOS processing, according to an embodiment of the present invention.

FIG. 4 illustrates a flowchart of a method for BIOS processing according to an embodiment of the present invention. In the illustrated embodiment, security module 106 is powered by standby power, meaning that security module 106 is provided with power as long as computing system 100 or 200 is connected to a power supply (for example plugged into an electric outlet or having the main battery in the battery bay) regardless of whether or not computing system 100 or 200 has been turned on. In one embodiment, method 400 is performed by security module 106.

In stage 402, security module 106 senses that standby power (VSB) has become available (i.e. after having not been available). For example, standby power may become available when computing system 100 or 200 is plugged into or back into a working electric outlet or when a battery powering computing system 100 or 200 is placed or placed again into the battery bay.

Once standby power becomes available, security module 106 may operate. Therefore in stage 404, security module 106 reads a BIOS section from NVM 104 via interface 132 or 232 and processes the read BIOS section in stage 406.

In some embodiments, the BIOS processing in stage 406 includes measuring the read section. In some of these embodiments, the BIOS measuring includes hashing the read BIOS section. Typically hashing includes applying a unidirectional function so that it is computationally infeasible for an attacker to determine the specific input message for the hash result and thereby have the ability to substitute a different input message which will produce the same measurement. For example, in some embodiments where there is hashing, the hash function used for hashing the read BIOS section is in accordance with a secure hash SHA standard as published by NIST. Continuing with the example in one of these embodiments the SHA-1 cryptographic hash is specifically used. In other embodiments security module 106 may perform additionally or alternatively other processing on part or all of the BIOS.

In optional stage 408, the result(s) of the BIOS processing, for example the BIOS hash(es), or function(s) thereof is stored in memory, for example in security module 106. The storing of the processing result(s) or function(s) thereof to memory may be performed for example by security module 106.

In one embodiment where security module 106 is a TPM, the TPM stores BIOS hash result(s) to one or more platform configuration register PCR within the TPM, for example PCR (0) and/or PCR(1).

In one embodiment, security module 106 reads a section of the BIOS from NVM 104 via interface 132 or 232 in stage 404, processes the read section in stage 406, and optionally the interim processing result or a function thereof is stored in memory in stage 408 prior to security module 106 reading another section of BIOS (i.e. prior to repeating stages 404, 406 and optionally 408 for another section). In another embodiment, stage 404 is executed only once with security module 106 reading all BIOS section(s) designated for processing from NVM 104 via interface 132 or 232, prior to processing any of the section(s). In another embodiment, all BIOS section(s) designated for processing by security module 106 may be read and processed together in a single execution of stages 404 and 406. In one embodiment, interim processing result(s) or function(s) thereof from various BIOS sections may be stored in memory in stage 408 as well as the final processing result(s) or function(s) thereof (resulting from the processing of all section(s) contributing to the final result(s)), whereas in another embodiment only final processing result(s) or function(s) thereof (resulting from the processing of all section(s) contributing to the final result(s)) may be stored in memory in stage 408. In another embodiment, stage 408 may be omitted and processing result(s) or function(s) thereof are not necessarily stored.

In one embodiment, only section(s) of BIOS code are read and processed. In another embodiment, only section(s) of BIOS data are processed. In another embodiment, BIOS code section(s) are read and processed separately from BIOS data section(s), and therefore separate final processing results are yielded. In another embodiment, a final processing result may represent processed section(s) from both the BIOS code and data. In another embodiment, there may be any number of final processing result(s), each representing the processing of section(s) of BIOS code and/or data.

In some embodiments where security module 106 is a TPM, a section of the BIOS is hashed into a result and the result is stored in a PCR (or another memory location). In one of these embodiments, the hashing is repeated for each BIOS section designated for processing, with the result previously stored to a PCR/another memory location (in the last iteration) concatenated with an additional section of BIOS hash result and hashed into an (updated) result. The hashing and storing is repeated until all of the BIOS designated for processing by the TPM have been hashed into a final result and stored in a PCR (or another memory location). In one of these embodiments, all of the BIOS is hashed into the final result (i.e. all of the BIOS is designated for processing by the TPM).

In one embodiment, any stored processing result(s) or function(s) thereof are secure. For example, the security may arise from the nature of the memory location used for storage in stage 408, i.e. because the memory is protected. As another example, the security may arise additionally or alternatively from the nature of the operation used. Continuing with the example, the extension of results described above may in some cases contribute to the security of the stored processing result(s) or function(s) thereof.

In some embodiments, computing system 100 or 200 may be turned on prior to the obtainment of the final processed BIOS result(s). In one of these embodiments, security module 106 is allowed to complete the obtainment of the final processing BIOS result(s) prior to CPU 102 running the BIOS. In another of these embodiments, CPU 102 may begin running any BIOS section(s) which have been already been read and processed by security module 106. In one embodiment, only if the processing result of a BIOS section conforms to a predetermined criterion, will CPU 102 run the BIOS section or only if the final processing result(s) of all of the BIOS section(s) designated for processing conforms to a predetermined criterion, will CPU 102 run the BIOS section(s). In another embodiment, there is no predetermined criterion and/or there is no evaluation whether processing result(s) of BIOS section(s) conform to a predetermined criterion and CPU 102 can therefore run the BIOS section(s) regardless of the processing result(s).

In some embodiments where security module 106 has not yet begun executing method 400 prior to computing system 100 being turned on and the reset period having passed, CPU 102 may execute the static CRTM, initializing a driver which in these embodiments is used by the host CPU to read, write, and control security module 106. The CPU may read at least part of the BIOS designated for processing via bus 122 and provide the read BIOS to security module 106 for processing in stage 406. In one of these embodiments, security module 106 may subsequently read any unread BIOS designated for processing via interface 132. In another of these embodiments, once CPU 102 has read at least part of the BIOS designated for processing, CPU 102 continues to read any unread BIOS designated for processing. In one of these embodiments, after computing system 100 has been turned on and the reset period has passed, CPU 102 checks whether standby power has been removed and restored, and only if standby power has been removed and restored (which in this embodiment should have been the trigger for security module 106 to execute method 400) CPU 102 reads at least part of the BIOS designated for processing.

In other embodiments, after computing system 100 or 200 has been turned on and the reset period has passed, CPU 102 may check whether security module 106 has begun process 400 and if not CPU 102 may instruct security module 106 to begin process 400 (for example starting with stage 404). For example, in one of these other embodiments, CPU 102 may use a predefined command or signal (which may in some cases be vendor specific) to check whether security module 106 has begun or is beginning process 400. In one of these other embodiments, CPU 102 first checks whether standby power has been removed and restored, and only if standby power has been removed and restored (which in this other embodiment should have been the trigger security module 106 to execute method 400) CPU 102 instructs security module 106 to begin process 400 (for example starting with stage 404). In another embodiment, CPU 102 does not check whether security module 106 has begun or is beginning process 400 and assumes that security module 106 has or will execute method 400.

In some embodiments of the invention, fewer, more, or different stages than those shown in FIG. 4 may be executed. In some embodiments of the invention the stages illustrated in FIG. 4 may be executed in a different order than shown in FIG. 4 and/or in some embodiments one or more stages may be executed simultaneously.

From the description of various embodiments of method 400, it should be evident to the reader that the presence of interface 132 or 232 enables security module 106 in some embodiments to control the BIOS reading in stage 404 and/or subsequent stages of method 400. In these embodiments, security module 106 directly accesses NVM 104 without requiring CPU 102 to function as an intermediary between security module 106 and NVM 104 (i.e. CPU 102 would necessarily be an intermediary if communication between security module 106 and NVM 104 was instead only via a bus connecting CPU 102 to each of security module 106 and NVM 104). Therefore in these embodiments with direct access by security module 106 to NVM 104, the BIOS reading is typically although not necessarily faster than when CPU 102 functions as the intermediary. In one of these embodiments where the interface which is used for interface 132 or interface 232 allows faster communication than a bus which would have connected or does connect intermediary CPU 102 to each of security module 106 and NVM 104, the BIOS reading may typically although not necessarily be accelerated even more in comparison.

It should also be evident to the reader that any BIOS handling performed by security module 106 during any time lag between standby power becoming available (or again available) and computing system 100 or 200 being turned on, translates in some cases into less (or no) required BIOS handling after the computing system 100 or 200 has been turned on and therefore typically although not necessarily a quicker boot up process. For example BIOS handling by security module can include inter-alia any of stages 404 to 408. In an embodiment where the time lag is sufficient to allow stages 402 through 408 to be completed prior to computing system 100 or 200 being turned on, then the boot up process typically although not necessarily saves on the time required to complete those stages.

In some embodiments, because the reading of the BIOS is triggered by the sensing of newly available standby power, method 400 may be executed less often than method 300, assuming that the resetting of computing system 100 or 200 (or the triggering type(s) of resetting) occurs more often than the standby power becomes newly available (i.e. the plug or main battery of computing system 100 or 200 is returned to the electric outlet/battery bay less often than computing system 100 or 200 is reset).

As mentioned above, the final BIOS processing result(s) and/or the interim BIOS processing result(s) may or may not be used, depending on the embodiment. The invention places no limits on if or how the BIOS processing result(s) is/are used.

In one embodiment, once CPU 102 is active (i.e. after the reset period has ended), security module 106 may assert an interrupt line to indicate that BIOS processed result(s) are available. In another embodiment, once CPU 102 is active, CPU 102 may poll and thereby realize that BIOS processing result(s) are available.

In some embodiments security module 106 may perform additional functions using the final BIOS processing result(s) and/or interim processing result(s). For the sake of further enlightening to the reader, some possible applications which may use the BIOS processing result(s) will now be described, but the described applications should not be construed as required and/or limiting.

In some embodiments, security module 106 may provide a protected storage service, similar to a known possible functionality of a TPM. In these embodiments, security module 106 may seal data using the content of one or more memory locations (holding representation of the measurements), for example the content one or more of the PCRs available in a TPM. For example, in one of these embodiments the content used for sealing may include the final and/or interim BIOS processing result(s) included for example in PCR(0). Security module 106 returns an encrypted blob representing the sealed data. Alternatively, security module 106 may be provided with an encrypted blob and asked to unseal the blob. Security module 106 will release the data (previously sealed by the content of one or more specified memory locations) only if the content of the specified one or more memory locations is the same as was during sealing.

In some embodiments, security module 106 may perform RSA private key operations, similar to a known possible functionality of a TPM. For example, in one of these embodiments, security module 106 may hold a private key and if a caller is authorized to use the private key, the caller may command security module 106 to use the key to sign a snapshot of the current content in one or more memory locations, which may for example include the final and/or interim BIOS processing result(s).

In one embodiment, security module 106 is relied upon for Bitlocker™ Drive Encryption, similar to a known possible functionality of a TPM. Microsoft® Windows Vista™ operating system includes Bitlocker™ Drive Encryption which in one implementation encrypts the operating system of the hard drive using root secrets and relies on a TPM to restrict access to these root secrets. Depending on the BIOS hash result as well as other hash results, the TPM unlocks the root secrets, thereby allowing the operating system to load, or does not unlock to root secrets. More information is provided for example at http://technet.microsoft.com/en-us/windows-vista/aa906017.aspx, which is hereby incorporated by reference herein.

In one embodiment depending on the final BIOS processing result(s) and/or interim BIOS processing results, computing system 100 or 200 may be permitted to continue or may be prevented from continuing to boot up.

In one embodiment depending on the final BIOS processing result(s) and/or interim BIOS processing results the computing system software may or may not rely on the BIOS (where not relying may include for example booting up in an alternative mode).

In one embodiment, the final BIOS processing result(s) and/or interim BIOS processing results may be used to take a snapshot of the system security status or to unlock encrypted protected data in security module 106.

Figure 5:
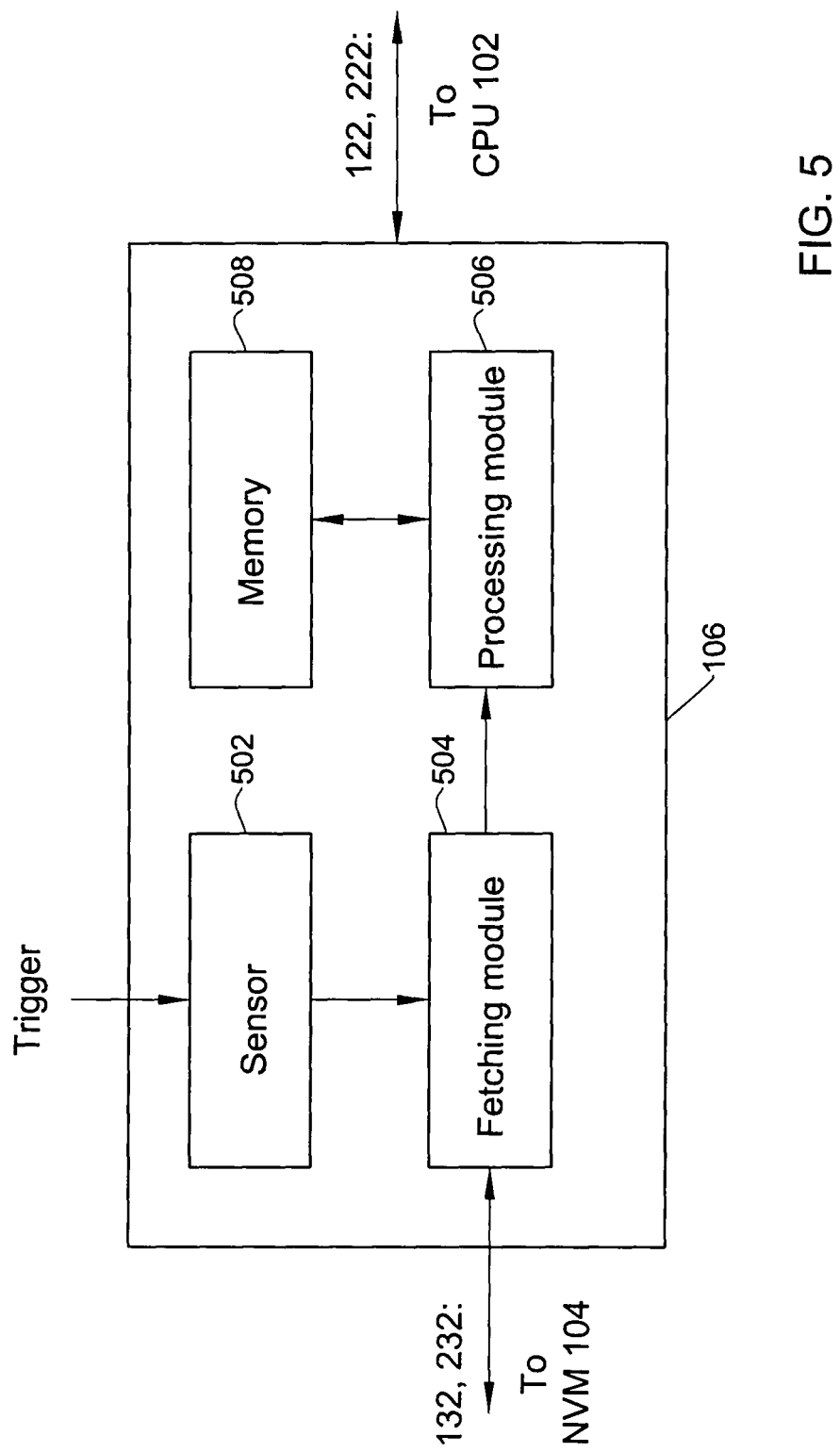
FIG. 5 is a block diagram of a security module, according to an embodiment of the present invention.

FIG. 5 is a block diagram of security module 106, according to an embodiment of the present invention. In the illustrated embodiment, security module 106 includes a sensing module 502, a fetching module 504, a processing module 506, and a memory 508. Each of modules 502, 504, 506, and 508 may be made up of any combination of software, hardware and/or firmware capable of performing the functions as defined and explained herein. For simplicity of illustration, memory 508 is shown as one unit although security module 106 may in some embodiments include different types of volatile and/or non-volatile memory and/or a plurality of memory banks. For example in one embodiment memory 508 may include any of the following inter-alia: registers, temporary memory input and output buffers and/or protected memory locations.

In the illustrated embodiment of security module 106, sensing module 502 is configured to sense trigger(s) for method 300 and/or 400. For example, sensing module 502 may be configured to sense the availability of standby power which was previously not available in stage 402 and/or may be configured to sense a computing system reset (or specific type(s) of reset) in stage 302. After sensor 502 has sensed a trigger, fetching module 504 is configured to directly access non-volatile memory 104 via interface 132 or 232. As mentioned before in one embodiment non-volatile memory 104 may be in the same physical package as security module 106, although not illustrated as such in FIG. 5. The fetched BIOS section or sections are processed by processing module 506. In one embodiment processing module 506 includes a hashing module, configured for example to execute the SHA-1 cryptographic hash. The final result(s) of the BIOS processing (for example of the hashing) and/or one or more interim result(s) of the processing (for example of the hashing) may in one embodiment be stored in memory 508. In one embodiment, in addition to sensor 502 being configured to sense trigger(s) for stage 302 or 402, sensor 502 may also be configured to sense when CPU 102 is active for example so that security module 106 may assert an interrupt line when the reset period has ended and the final BIOS processing result(s) is available for CPU 102.

In some embodiments of the invention, security module 106 may comprise fewer, more, and/or different modules than those shown in FIG. 5. For example, in one embodiment security module may in addition or instead include inter-alia: module(s) for generation and/or protection of cryptographic keys, and/or a random number generator module. In other embodiments of the invention, the functionality of security module 106 described herein may be divided differently into the modules of FIG. 5. In other embodiments of the invention, the functionality of security module 106 described herein may be divided into fewer, more and/or different modules than shown in FIG. 5 and/or security module 106 may include additional or less functionality than described herein. In other embodiments of the invention, one or more modules shown in FIG. 5 may have more, less and/or different functionality than described. For example in one embodiment, processing module 506 may perform additional functions, for example any of sealing/unsealing, signing snapshots, restricting access to secrets, RSA private key operations, etc, or one or more of these additional functions may be performed elsewhere in security module 106.

In some embodiments of the inventions, because security module 106 interfaces directly to NVM 104 via interface 132 or 232, the BIOS in NVM 104 which is run by CPU 102 may exclude any code and/or data associated with functionality that is performed by security module 106 instead of CPU 102. For example, in one of these embodiments the BIOS in NVM 104 may exclude code and/or data associated with calling a CPU to read section(s) of the BIOS (because security module 106 instead reads the section(s)) and/or may exclude code and/or data associated with calling a CPU to feed BIOS section(s) to a security module (for example to a TPM). In another embodiment, code and/or data associated with calling CPU 102 to read section(s) of the BIOS which are instead read by security module 106, and/or code and/or data associated with calling CPU 102 to feed BIOS section(s) to security module 106 is/are included in the BIOS in NVM 104. For example, the reading and/or feeding code and/or data may be included in the BIOS in NVM 104 in order to maintain backwards compatibility. As another example the reading and/or feeding code and/or data may be included in the BIOS in NVM 104 because in some embodiments CPU 102 may have the capability of reading section(s) of the BIOS and feeding BIOS section(s) to security module 106 under certain circumstances, for example if security module 106 has failed to begin or complete method 300 or 400.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

While the invention has been shown and described with respect to particular embodiments, it is not thus limited. Numerous modifications, changes and improvements within the scope of the invention will now occur to the reader.

The invention claimed is:

1. A method of Basic Input/Output System BIOS processing in a computing system, comprising:
   a security module in the computing system sensing that standby power has become available after having not been available;
   said security module reading at least part of a BIOS stored in a non-volatile memory in the computing system via an interface that directly connects said security module with said non-volatile memory; and
   said security module processing said at least part of the BIOS, wherein
      said security module is configured to operate on standby power, and
      said reading begins after standby power becomes available,
   wherein, after the computing system has been reset, a central processing unit in the computing system begins to run said at least part of the BIOS at an earlier point in time than if after the computing system has been reset, said central processing unit would have had to read said at least part of the BIOS and provide said at least part of the BIOS to said security module for processing.

2. The method of claim 1, wherein said processing includes measuring.

3. The method of claim 2, wherein said measuring includes hashing.

4. The method of claim 1, further comprising:
   said security module storing at least one result of said processing or a function thereof in memory in said security module.

5. A method of Basic Input/Output System BIOS processing in a computing system, comprising:
   a security module in the computing system sensing that standby power has become available after having not been available;
   said security module then reading at least part of the BIOS stored in a non-volatile memory in the computing system via an interface which directly connects said security module with said non-volatile memory; and
   said security module processing said at least part of the BIOS, wherein said security module is configured to operate on standby power,
   wherein, after the computing system has been reset, a central processing unit in the computing system begins to run said at least part of the BIOS at an earlier point in time than if after the computing system has been reset, said central processing unit would have had to read said at least part of the BIOS and provide said at least part of the BIOS to said security module for processing.

6. The method of claim 5, wherein said processing includes hashing.

7. A system for Basic Input/Output System BIOS processing, comprising:
   a non-volatile memory configured to store the BIOS;
   a security module configured to:
      read at least part of the BIOS,
      process said at least part of the BIOS,
      operate on standby power, and
      sense that standby power has become available after having not been available, and
   an interface directly connecting between said security module and said non-volatile memory, wherein said security module is configured to begin reading said at least part of the BIOS after standby power which was not available becomes available,
   wherein, after the system has been reset, a central processing unit in the system begins to run said at least part of the BIOS at an earlier point in time than if after the system has been reset, said central processing unit would have had to read said at least part of the BIOS and provide said at least part of the BIOS to said security module for processing.

8. The system of claim 7, further comprising:
   an interface connecting between said central processing unit and said security module.

9. The system of claim 8, further comprising:
   an interface connecting between said central processing unit and said non-volatile memory.

10. The system of claim 9, wherein said interface connecting between said security module and said non-volatile memory is configured to allow faster communication than said interface connecting between said central processing unit and said non-volatile memory or faster communication than said interface between said central processing unit and said security module.

11. The system of claim 9, wherein said central processing unit is configured to begin to run said at least part of the BIOS at an earlier point in time after a reset than if said central processing unit were configured after said reset to read said at least part of the BIOS and provide said at least part of the BIOS to said security module for processing.

12. The system of claim 7, wherein said security module and said non volatile memory are included in a same physical package.

13. A security module for Basic Input/Output System BIOS processing, comprising:
   a sensor configured to sense a trigger for reading at least part of the BIOS, wherein said trigger includes standby power becoming available after having not been available;
   a fetching module configured to read said at least part of the BIOS from a non-volatile memory storing the BIOS via an interface directly connecting between said non volatile memory and said security module after said sensor has sensed said trigger; and a processing module configured to process said at least part of the BIOS that has been read, wherein said security module is configured to operate on standby power, wherein, after a computing system for operating the Basic Input/Output System BIOS processing has been reset, a central processing unit in the computing system begins to run said at least part of the BIOS at an earlier point in time than if after the computing system has been reset, said central processing unit would have had to read said at least part of the BIOS and provide said at least part of the BIOS to said security module for processing.

14. The security module of claim 13, wherein said processing module is configured to hash said at least part of the BIOS that has been read.

15. The security module of claim 13, further comprising: memory configured to store at least one result of said processing or a function thereof.

16. The security module of claim 13, wherein said module complies with a Trusted Computing Group specification.

* * * * *